United States Patent
Dai et al.

(10) Patent No.: US 11,249,719 B2
(45) Date of Patent: Feb. 15, 2022

(54) AUDIO PLAYBACK CONTROL METHOD OF MOBILE TERMINAL, AND WIRELESS EARPHONE

(71) Applicant: GOERTEK INC., Weifang (CN)

(72) Inventors: Tianrong Dai, Weifang (CN); Yuge Zhu, Weifang (CN)

(73) Assignee: GOERTEK INC., Weifang (CN)

( * ) Notice: Subject to any disclaimer, the term of this patent is extended or adjusted under 35 U.S.C. 154(b) by 87 days.

(21) Appl. No.: 16/474,301

(22) PCT Filed: Jul. 5, 2018

(86) PCT No.: PCT/CN2018/094657
§ 371 (c)(1),
(2) Date: Aug. 20, 2019

(87) PCT Pub. No.: WO2019/052269
PCT Pub. Date: Mar. 21, 2019

(65) Prior Publication Data
US 2020/0301650 A1 Sep. 24, 2020

(30) Foreign Application Priority Data
Sep. 15, 2017 (CN) .......................... 201710835337.8

(51) Int. Cl.
*G06F 3/16* (2006.01)
*G06F 3/01* (2006.01)
(Continued)

(52) U.S. Cl.
CPC .............. *G06F 3/165* (2013.01); *G06F 3/017* (2013.01); *H04M 1/72442* (2021.01); *H04R 1/1041* (2013.01)

(58) Field of Classification Search
CPC ...... G06F 3/017; G06F 3/0488; G06F 3/0346; G06F 3/165; G06F 1/1694;
(Continued)

(56) References Cited

U.S. PATENT DOCUMENTS

2013/0094659 A1\* 4/2013 Liu ...................... H04R 1/1041
381/74
2017/0280223 A1\* 9/2017 Cavarra .............. G06F 3/03547

FOREIGN PATENT DOCUMENTS

CN 101895799 A 11/2010
CN 106028212 A 10/2016
(Continued)

OTHER PUBLICATIONS

International Search Report for Application No. PCT/CN2018/094657 dated Sep. 13, 2018.
(Continued)

*Primary Examiner* — Duc Nguyen
*Assistant Examiner* — Alexander L Eljaiek
(74) *Attorney, Agent, or Firm* — Moser Taboada

(57) ABSTRACT

An audio playback control method of a mobile terminal comprises: collecting proximity information of a user's hand within a preset time period by using a plurality of proximity sensors of a wireless earphone; acquiring information about whether each proximity sensor is shielded at each moment within the preset time period according to the proximity information; determining the order in which different proximity sensors are shielded according to the information about each proximity sensor being shielded; acquiring an operation trajectory of the user's hand according to the order in which different proximity sensors are shielded; and acquiring a corresponding audio playback operation instruction according to the operation trajectory and a preset trajectory instruction library, to realize the control over the
(Continued)

audio playback of the mobile terminal. A wireless earphones comprises: a plurality of proximity sensors, a memory and a processor, and each proximity sensor and the memory are all connected to the processor. The present disclosure increases the variety of control operations on the audio playback of the mobile terminal through the wireless earphone, and will not cause physical impact on the user's ear, thereby improving the user experience.

10 Claims, 2 Drawing Sheets

(51) Int. Cl.
*H04R 1/10* (2006.01)
*H04M 1/72442* (2021.01)

(58) Field of Classification Search
CPC . G06F 2200/1637; H04R 1/1041; H04R 1/10; H04R 1/1091; H04R 5/033; H04S 7/304; H04M 1/72442

USPC .................................. 381/74; 700/94; 710/8
See application file for complete search history.

(56) References Cited

FOREIGN PATENT DOCUMENTS

| | | |
|---|---|---|
| CN | 107465972 A | 12/2017 |
| EP | 2680553 A1 | 1/2014 |

OTHER PUBLICATIONS

Chinese Search Report for Application No. 201710835337.8 dated Nov. 11, 2019.

\* cited by examiner

AUDIO PLAYBACK CONTROL METHOD OF MOBILE TERMINAL, AND WIRELESS EARPHONE

CROSS-REFERENCE TO RELATED APPLICATIONS

This application is a U.S. National Stage entry under 35 U.S.C. § 371 based on International Application No. PCT/CN2018/094657, filed on Jul. 5, 2018, which was published under PCT Article 21(2) and which claims priority to Chinese Patent Application No. 201710835337.8, filed on Sep. 15, 2017. The embodiment of the priority applications are hereby incorporated herein in their entirety by reference.

TECHNICAL FIELD

The present disclosure relates to the technical field of wireless earphones, and more specifically to an audio playback control method of a mobile terminal and a wireless earphone.

BACKGROUND ART

The audio output end of mobile terminals such as earphones is an electro-acoustic conversion unit for receiving an electrical signal emitted by the mobile terminal and converting the electrical signal into an audible sound wave. Earphones can be divided into two types: wired and wireless. The volume adjustment, audio switching and play/pause control in the audio playback of the mobile terminal can be realized through earphones.

Conventional wired earphones are generally provided with a plurality of (usually three) touch buttons, and the user can control the audio playback of the mobile terminal by clicking the touch buttons. For example, in a conventional wired earphone, a "+" touch button, a central touch button and a "−" touch button are provided. In the audio playback process of the mobile terminal, clicking the "+" touch button will increase the volume, clicking the "−" touch button will reduce the volume; clicking the central touch button will pause playback, clicking the central touch button again will continue playback; quickly clicking the "+" touch button twice will play the previous audio; quickly clicking the "−" touch button twice will play the next audio.

Wireless earphones that have emerged in recent years, especially in-ear wireless earphones, have not a connection cable between two earphones, and their size is usually small, so generally the touch buttons cannot be installed on the wireless earphone. In order to realize the control over the audio playback of the mobile terminal, in a conventional wireless earphone, an acceleration sensor is provided. When the user double-clicks the earphone, the acceleration sensor collects the waveform information of the earphone vibration, and the collected waveform information of the earphone vibration will be matched with preset waveform information, and thus pausing playback can be realized, but volume adjustment and audio switching are not supported. However, if the user double-clicks the earphone too gently, the user's operation may not be recognized; if the user double-clicks the earphone too heavily, the physical impact on the user's ear may be great, and the user experience is poor.

SUMMARY

In order to solve the problems of conventional wireless earphones that the control operations on the audio playback of the mobile terminal is limited and the user experience is poor, the present disclosure provides an audio playback control method of a mobile terminal and a wireless earphone.

An embodiment of the present disclosure provides an audio playback control method of a mobile terminal, comprising:

collecting proximity information of a user's hand within a preset time period by using a plurality of proximity sensors of a wireless earphone;

acquiring information about whether each proximity sensor is shielded at each moment within the preset time period according to the proximity information;

determining an order in which different proximity sensors are shielded according to the information about each proximity sensor being shielded;

acquiring an operation trajectory of the user's hand according to the order in which different proximity sensors are shielded;

acquiring a corresponding audio playback operation instruction according to the operation trajectory and a preset trajectory instruction library; and transmitting the audio playback operation instruction to the mobile terminal, so that the mobile terminal executes the audio playback operation instruction.

Another embodiment of the present disclosure provides a wireless earphone, comprising: a plurality of proximity sensors, a memory and a processor; wherein each proximity sensor and the memory are all connected to the processor;

the proximity sensor is arranged on an outer surface of the wireless earphone, and is for collecting proximity information of a user's hand within a preset time period;

the processor is for acquiring an operation trajectory of the user's hand according to the proximity information;

acquiring a corresponding audio playback operation instruction according to the operation trajectory and a preset trajectory instruction library in the memory; and transmitting the audio playback operation instruction to a mobile terminal, so that the mobile terminal executes the audio playback operation instruction.

The advantageous effects of the present disclosure are as follows. A plurality of proximity sensors are arranged on an outer surface of the wireless earphone, and collect proximity information of the user's hand within a preset time period. An operation trajectory of the user's hand is acquired according to the proximity information. A corresponding audio playback operation instruction is acquired according to the operation trajectory and the preset trajectory instruction library. The audio playback of the mobile terminal is controlled according to the acquired audio playback operation instruction. Thereby, compared with the prior art, the variety of control operations on the audio playback of the mobile terminal is increased, and the user only needs to approach or touch the proximity sensors on the earphone without the need to double-click the earphone, which will not cause physical impact on the user's ear, thereby improving the user experience. Moreover, the proximity sensors can be installed at a position where the space is very limited without affecting the user's operation instructions, so the operation efficiency of the earphone can be ensured.

DETAILED DESCRIPTION

In order to solve the technical problems described in the background art, the inventors of the present disclosure come up with the following idea. A plurality of proximity sensors are arranged on an outer surface of the wireless earphone, and collect proximity information of the user's hand within a preset time period. An operation trajectory of the user's hand is acquired according to the proximity information. A corresponding audio playback operation instruction is acquired according to the operation trajectory and the preset trajectory instruction library. The audio playback of the mobile terminal is controlled according to the acquired audio playback operation instruction. Thereby, the variety of control operation on the audio playback of the mobile terminal through the wireless earphone is increased, and the user only needs to approach or touch the proximity sensors on the earphone without the need to double-click the earphone, which will not cause physical impact on the user's ear, thereby improving the user experience. Moreover, the proximity sensors can be installed at a position where the space is very limited without affecting the user's operation instructions, so the operation efficiency of the earphone can be ensured.

In order to make the objectives, technical solutions and advantages of the present disclosure clearer, the embodiments of the present disclosure will be further described in detail below with reference to the accompanying drawings.

Figure 1:
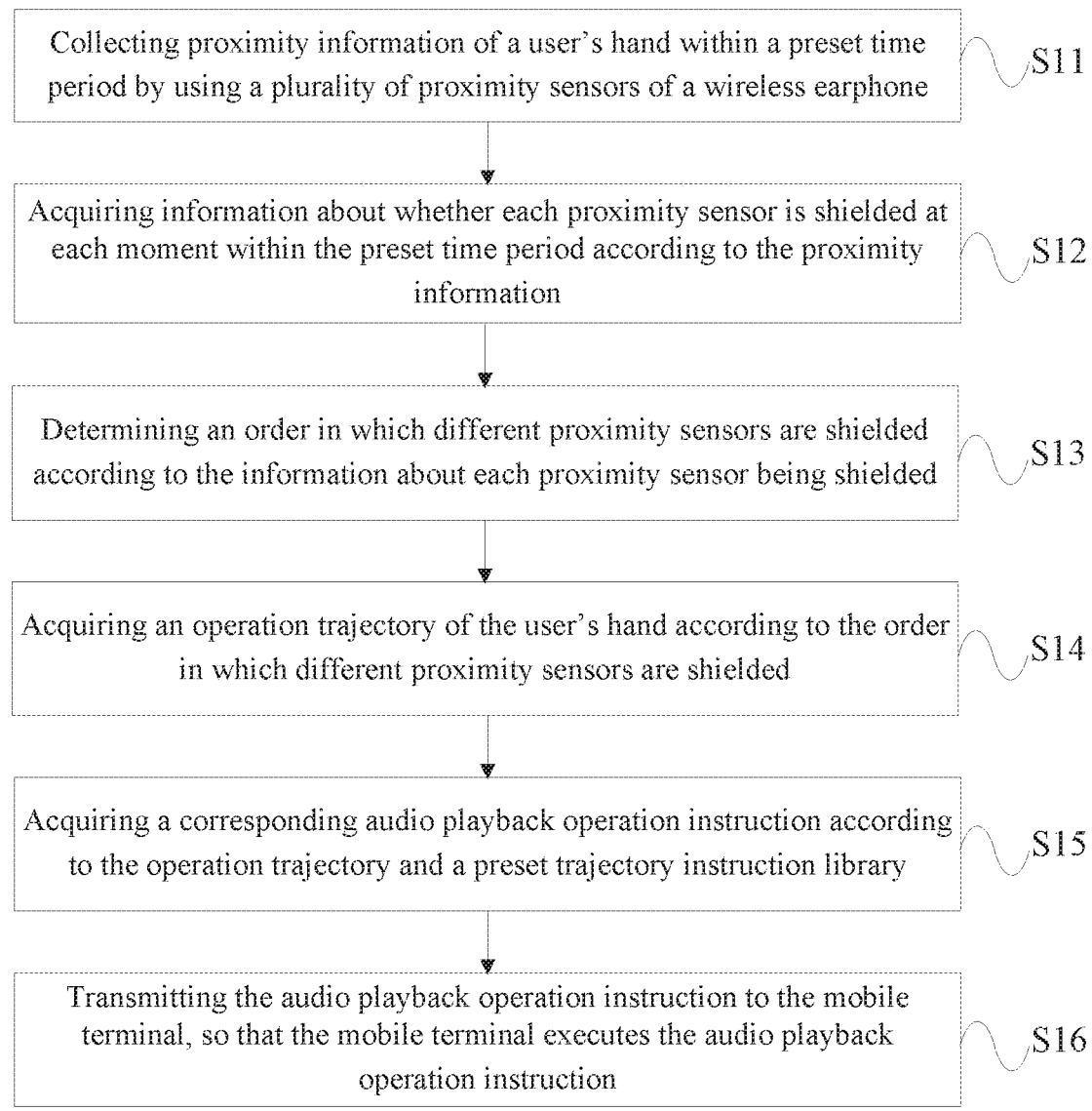
FIG. 1 is a schematic flow diagram of an audio playback control method of a mobile terminal according to an embodiment of the present disclosure.

FIG. 1 is a schematic flow diagram of an audio playback control method of a mobile terminal according to an embodiment of the present disclosure. As shown in FIG. 1, the method in the present embodiment is performed by a wireless earphone, and comprises:

S11: collecting proximity information of a user's hand within a preset time period by using a plurality of proximity sensors of a wireless earphone.

It should be noted that, in the present embodiment, the outer surface of the wireless earphone is provided with a plurality of proximity sensors. When the user's hand approaches or touches a proximity sensor, the proximity sensor will be shielded, and the proximity information is collected at this moment.

In practical applications, the preset time period may be set to 1 s-2 s, and of course, it may be set to other values according to actual needs, which is not limited in the present disclosure.

In practical applications, the mobile terminal may be a mobile phone or a device suitable for audio playback, such as a tablet computer, which is not limited in the present disclosure.

S12: acquiring information about whether each proximity sensor is shielded at each moment within the preset time period according to the proximity information.

It should be noted that, in the present embodiment, information about each proximity sensor being shielded at each moment within the preset time period can be acquired according to the proximity information of each proximity sensor in a preset time.

S13: determining an order in which different proximity sensors are shielded according to the information about each proximity sensor being shielded.

In practical applications, the user's hand approaches or touches different proximity sensors in a certain order. In the present embodiment, the order in which different proximity sensors are shielded can be determined according to the information about each proximity sensor being shielded at each moment.

S14: acquiring an operation trajectory of the user's hand according to the order in which different proximity sensors are shielded.

It is understandable that the operation trajectory of the user's hand can be determined according to the order in which different proximity sensors are shielded.

S15: acquiring a corresponding audio playback operation instruction according to the operation trajectory and a preset trajectory instruction library.

It should be noted that operation trajectories and audio playback operation instructions corresponding to the operation trajectories are stored in the preset trajectory instruction library, and the corresponding audio playback operation instruction can be acquired by searching the preset trajectory instruction library according to the acquired operation trajectory.

In practical applications, audio playback operation instructions include reducing volume, increasing volume, switching to the previous audio, switching to the next audio, and play/pause.

S16: transmitting the audio playback operation instruction to the mobile terminal, so that the mobile terminal executes the audio playback operation instruction.

In the present embodiment, the wireless earphone sends the determined audio playback operation instruction to the mobile terminal, and the mobile terminal executes the audio playback operation instruction to realize control over the audio playback of the mobile terminal.

According to the audio playback control method of a mobile terminal provided by the present embodiment, a plurality of proximity sensors are arranged on an outer surface of the wireless earphone, and collect proximity information of the user's hand within a preset time period; an operation trajectory of the user's hand is acquired according to the proximity information; a corresponding audio playback operation instruction is acquired according to the operation trajectory and the preset trajectory instruction library; and the audio playback of the mobile terminal is controlled according to the acquired audio playback operation instruction. Compared with the prior art, the variety of control operations on the audio playback of the mobile terminal through the wireless earphone is increased, and the user only needs to approach or touch the proximity sensors on the earphone without the need to double-click the earphone, which will not cause physical impact on the user's ear, thereby improving the user experience. Moreover, the proximity sensors can be installed at a position where the space is very limited without affecting the user's operation instructions, so the operation efficiency of the earphone can be ensured.

In an optional embodiment of the present disclosure, the proximity sensors are infrared proximity sensors; and the step of acquiring information about whether each proximity sensor is shielded at each moment within the preset time period according to the proximity information comprises:

if the intensity of an infrared signal detected by an infrared receiver of a target proximity sensor at a certain moment is greater than or equals to a preset threshold, determining that the target proximity sensor is shielded at the certain moment; and if the intensity of an infrared signal detected by an infrared receiver of a target proximity sensor at a certain moment is less than a preset threshold, determining that the target proximity sensor is not shielded at the certain moment.

It is understandable that the infrared proximity sensor includes an infrared emitter for transmitting an infrared signal and an infrared receiver for receiving an infrared signal reflected by a user's hand. Therefore, when the intensity of the infrared signal detected by the infrared receiver of the proximity sensor at a certain moment is greater than or equals to a preset threshold, it indicates that the infrared receiver of the proximity sensor has received an infrared signal reflected by the user's hand, and the proximity sensor is shielded at the certain moment. When the intensity of the infrared signal detected by the infrared receiver of the proximity sensor at a certain moment is less than a preset threshold, it indicates that the infrared receiver of the proximity sensor has not received an infrared signal reflected by the user's hand, and the proximity sensor is not shielded at the certain moment.

In practical applications, the transmitting power of the infrared transmitter and the sensing threshold (preset threshold) of the receiver can be set to adjust the perceived distance of the proximity sensor (for example, 2 mm-3 mm). If the transmitting power of the infrared emitter is set small enough and the sensing threshold of the infrared receiver is set high enough, only when the user's hand touches or approaches very closely it will be perceived, and at a distance greater than this it will not be perceived.

Further, the plurality of proximity sensors are sequentially arranged along a same curve or a same straight line, so that the user operates along the curve or the straight line where the plurality of sensors are located.

In practical applications, the plurality of proximity sensors may be sequentially arranged from top to bottom, or from left to right, or in other directions, along the same curve or straight line in an area of the outer surface of the wireless earphone.

It is suitable for a wireless earphone with a small external surface area to sequentially arranging a plurality of proximity sensors along the same curve or the same straight line, and it is also easy to use and avoid misoperation. In practical applications, when the user's finger slides from one proximity sensor to another along the direction of a curve or a straight line, and sequentially touches or approaches the proximity sensors. At each moment within a preset time period, the state of each proximity sensor will be unshielded→shielded→unshielded. However, every two proximity sensors are shielded one by one in the order of time.

In practical applications, the proximity sensors should be spaced at a suitable distance (for example, 6 mm-10 mm) lest the user's hand approaches more than one proximity sensor at the same time.

It is understandable that the manner of arranging a plurality of proximity sensors along the same curve is suitable for a planar surface of the wireless earphone as well as a curved surface such as a cylindrical surface of the wireless earphone.

Preferably, the plurality of sensors include a first proximity sensor and a second proximity sensor;

the trajectory instruction library stores operation trajectories and audio playback operation instructions corresponding to the operation trajectories;

the step of acquiring a corresponding audio playback operation instruction according to the operation trajectory and a preset trajectory instruction library comprises:

if the operation trajectory is movement from the first proximity sensor to the second proximity sensor, acquiring an audio playback operation instruction to reduce volume;

if the operation trajectory is movement from the second proximity sensor to the first proximity sensor, acquiring an audio playback operation instruction to increase volume;

if the operation trajectory is movement from the second proximity sensor to the first proximity sensor first and then from the first proximity sensor to the second proximity sensor, acquiring an audio playback operation instruction to switch to the previous audio; and if the operation trajectory is movement from the first proximity sensor to the second proximity sensor first and then from the second proximity sensor to the first proximity sensor, acquiring an audio playback operation instruction to switch to the next audio.

Preferably, the plurality of sensors include a first proximity sensor and a second proximity sensor;

the trajectory instruction library stores operation trajectories and audio playback operation instructions corresponding to the operation trajectories;

the step of acquiring a corresponding audio playback operation instruction according to the operation trajectory and a preset trajectory instruction library comprises:

if the first proximity sensor or the second proximity sensor is shielded more than one time continuously within the preset time period, determining the operation trajectory to be touching the first proximity sensor or the second proximity sensor more than one time continuously, and thus determining the audio playback operation instruction to be play/pause. For example, the operation trajectory of the user's hand to the first proximity sensor within 400 ms is: touching the first proximity sensor from the 100th ms to the 199th ms; lifting the finger at the 200th ms; touching the first proximity sensor again from the 300th ms to the 399th ms; lifting the finger at the 400th ms. In other words, the user's hand touches the first proximity sensor twice within 400 ms, and the first proximity sensor is shielded twice continuously within 400 ms, so the corresponding audio playback operation instruction is play/pause.

It is understandable that in the present embodiment, the number of proximity sensors is not limited to two, and more proximity sensors may be provided. It is a preferred embodiment to provide two proximity sensors on the outer surface of the wireless earphone, and the volume adjustment, audio switching and play/pause control of the audio playback of the mobile terminal can be performed only by processing the proximity information collected by the two proximity sensors, so it saves cost and is more suitable for a wireless earphone with a small external surface area.

Figure 2:
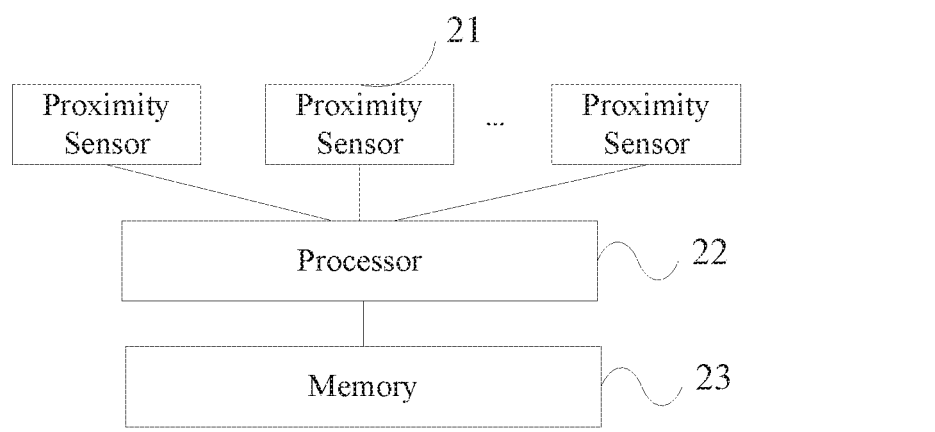
FIG. 2 is a schematic structural diagram of a wireless earphone according to an embodiment of the present disclosure.

FIG. 2 is a schematic structural diagram of a wireless earphone according to an embodiment of the present disclosure. As shown in FIG. 2, the wireless earphone of the present embodiment comprises: a plurality of proximity sensors 21, a memory 23 and a processor 22. The proximity sensors 21 and the memory 23 are all connected to the processor 22.

The proximity sensor 21 is arranged on an outer surface of the wireless earphone, and is for collecting proximity information of a user's hand within a preset time period and sending the proximity information to the processor.

The processor 22 is for acquiring information about whether each proximity sensor is shielded at each moment within the preset time period according to the proximity information;

determining an order in which different proximity sensors are shielded according to the information about each proximity sensor being shielded;

acquiring an operation trajectory of the user's hand according to the order in which different proximity sensors are shielded;

acquiring a corresponding audio playback operation instruction according to the operation trajectory and a preset trajectory instruction library in the memory; and transmitting the audio playback operation instruction to a mobile terminal, so that the mobile terminal executes the audio playback operation instruction.

According to the wireless earphone provided by the present embodiment, a plurality of proximity sensors are arranged on an outer surface of the wireless earphone, and collect proximity information of the user's hand within a preset time period; an operation trajectory of the user's hand is acquired according to the proximity information; a corresponding audio playback operation instruction is acquired according to the operation trajectory and the preset trajectory instruction library; and the audio playback of the mobile terminal is controlled according to the acquired audio playback operation instruction. Compared with the prior art, the variety of control operations on the audio playback of the mobile terminal through the wireless earphone is increased, and the user only needs to approach or touch the proximity sensors on the earphone without the need to double-click the earphone, which will not cause physical impact on the user's ear, thereby improving the user experience. Moreover, the proximity sensors can be installed at a position where the space is very limited without affecting the user's operation instructions, so the operation efficiency of the earphone can be ensured.

In an optional embodiment of the present disclosure, the proximity sensor is an infrared proximity sensor which is provided with an infrared emitter for sending an infrared signal outward and an infrared receiver for receiving an infrared signal reflected by a user's hand.

The processor 22 is further for:

if the intensity of an infrared signal detected by an infrared receiver of a target proximity sensor at a certain moment is greater than or equals to a preset threshold, determining that the target proximity sensor is shielded at the certain moment; and if the intensity of an infrared signal detected by an infrared receiver of a target proximity sensor at a certain moment is less than a preset threshold, determining that the target proximity sensor is not shielded at the certain moment.

Further, the plurality of proximity sensors are sequentially arranged along the same curve or the same straight line.

In practical applications, the plurality of proximity sensors may be sequentially arranged from top to bottom, or from left to right, or in other directions, along the same curve or straight line in an area of the outer surface of the wireless earphone.

In an optional embodiment of the present disclosure, the plurality of sensors include a first proximity sensor and a second proximity sensor;

the trajectory instruction library stores operation trajectories and audio playback operation instructions corresponding to the operation trajectories;

the processor is further for:

if the operation trajectory is movement from the first proximity sensor to the second proximity sensor, acquiring an audio playback operation instruction to reduce volume;

if the operation trajectory is movement from the second proximity sensor to the first proximity sensor, acquiring an audio playback operation instruction to increase volume;

if the operation trajectory is movement from the second proximity sensor to the first proximity sensor first and then from the first proximity sensor to the second proximity sensor, acquiring an audio playback operation instruction to switch to the previous audio; and if the operation trajectory is movement from the first proximity sensor to the second proximity sensor first and then from the second proximity sensor to the first proximity sensor, acquiring an audio playback operation instruction to switch to the next audio.

In another optional embodiment of the present disclosure, the plurality of sensors include a first proximity sensor and a second proximity sensor;

the trajectory instruction library stores operation trajectories and audio playback operation instructions corresponding to the operation trajectories;

the processor is further for:

if the first proximity sensor or the second proximity sensor is shielded more than one time continuously within the preset time period, determining the operation trajectory to be touching the first proximity sensor or the second proximity sensor more than one time continuously, and thus determining the audio playback operation instruction to be play/pause.

As a preferred embodiment of the present disclosure, the plurality of proximity sensors are sequentially arranged along the same straight line.

Specifically, the number of the proximity sensors is two to four.

In an optional embodiment of the present disclosure, the plurality of proximity sensors are arranged on an outer surface of a battery compartment of the wireless earphone.

Figure 3:
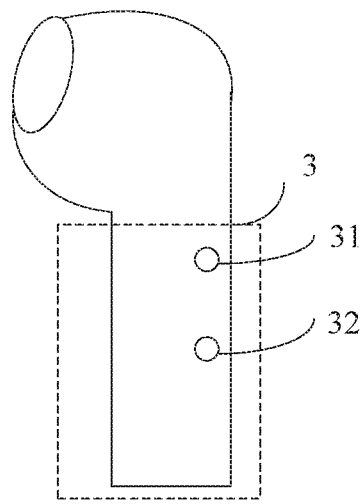
FIG. 3 is a schematic diagram showing installing positions of proximity sensors according to an embodiment of the present disclosure.

As shown in FIG. 3, a first proximity sensor 31 and a second proximity sensor 32 are arranged on the outer surface of the wireless earphone, and more specifically, on the outer surface of the battery compartment 3 of the wireless earphone.

In another optional embodiment of the present disclosure, the plurality of proximity sensors are arranged on an outer surface of a connection part between a battery compartment and an earplug of the wireless earphone.

Figure 4:
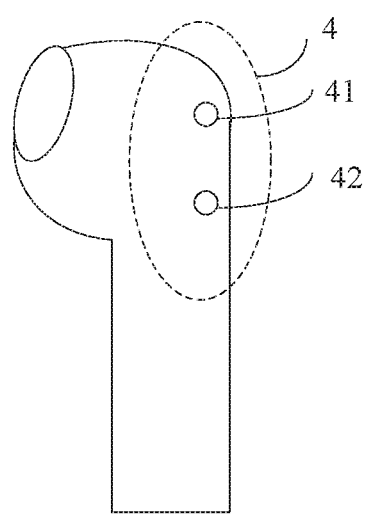
FIG. 4 is a schematic diagram showing installing positions of proximity sensors according to another embodiment of the present disclosure.

As shown in FIG. 4, a first proximity sensor 41 and a second proximity sensor 42 are arranged on the outer surface of the wireless earphone, and more specifically, on an outer surface of a connection part 4 between a battery compartment and an earplug of the wireless earphone.

It is understandable that the installing position of the proximity sensor is not limited to the above two ways, and the plurality of proximity sensors may be arranged at other positions on the outer surface of the wireless earphone as long as the proximity information of the user's hand can be collected.

In sum, according to the technical solutions of the present disclosure, a plurality of proximity sensors are arranged on an outer surface of the wireless earphone, and collect proximity information of the user's hand within a preset time period; an operation trajectory of the user's hand is acquired according to the proximity information; a corresponding audio playback operation instruction is acquired according to the operation trajectory and the preset trajectory instruction library; and the audio playback of the mobile terminal is controlled according to the acquired audio playback operation instruction. Compared with the prior art, the variety of control operations on the audio playback of the mobile terminal through the wireless earphone is increased, and the user only needs to approach or touch the proximity sensors on the earphone without the need to double-click the earphone, which will not cause physical impact on the user's ear, thereby improving the user experience. Moreover, the proximity sensors can be installed at a position where the space is very limited without affecting the user's operation instructions, so the operation efficiency of the earphone can be ensured.

As will be appreciated by a person skilled in the art, embodiments of the present disclosure may be embodied as a system, method or computer program product. Thus, the present disclosure may take the form of an entirely hardware embodiment, an entirely software embodiment, or an embodiment combining software and hardware. Furthermore, the present disclosure may take the form of a computer program product embodied on one or more computer-usable storage media (including but not limited to magnetic storage media, CD-ROMs, optical storage media, etc.) having computer-usable program codes recorded thereon.

The present disclosure is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

It should be noted that the terms, "comprise", "include" or any other variants are intended to cover non-exclusive inclusion, so that the process, method, article or apparatus including a series of elements may not only include those elements, but may also include other elements not stated explicitly, or elements inherent to the process, method, articles or apparatus. Without more limitations, an element defined by the sentence "comprising a . . . " does not exclude the case that there are other same elements in the process, method, article or apparatus including the element.

In the description of the present disclosure, many specific details are illustrated. However, it should be understood that embodiments of the present disclosure may be practiced without these specific details. In some instances, well-known methods, structures and techniques have not been shown in detail in order not to obscure the understanding of this description. Similarly, it should be understood that in order to simplify the disclosure of the present disclosure and help understand one or more of the various inventive aspects, in the above description of exemplary embodiments of the present disclosure, various features of the present disclosure are sometimes grouped together in a single embodiment, diagrams, or description thereof. However, the disclosed method should not be interpreted as reflecting an intention that the claimed present disclosure requires more features than those expressly recited in each claim. More exactly, as the following claims reflect, inventive aspects include features less than all features of a single foregoing disclosed embodiment. Thus, the claims following the detailed description are hereby expressly incorporated into this detailed description, with each claim being an independent embodiment of the present disclosure.

The above merely describes particular embodiments of the present disclosure. By the teaching of the present disclosure, a person skilled in the art can make other modifications or variations based on the above embodiments. A person skilled in the art should appreciate that, the detailed description above is only for the purpose of better explaining the present disclosure, and the protection scope of the present disclosure should be subject to the protection scope of the claims.

What is claimed is:

1. An audio playback control method of a mobile terminal, comprising:
    collecting proximity information of a user's hand within a preset time period by using a plurality of proximity sensors of a wireless earphone, wherein the proximity sensors are spaced at a distance of 6 mm-10 mm lest the user's hand approaches more than one proximity sensor at the same time, wherein the plurality of proximity sensors include a first proximity sensor and a second proximity sensor, and wherein the plurality of proximity sensors are sequentially arranged along a curve or a straight line so that the user operates along the curve or the straight line where the plurality of proximity sensors are located;
    acquiring information about whether each proximity sensor is shielded at each moment within the preset time period according to the proximity information;
    determining an order in which different proximity sensors are shielded according to the information about each proximity sensor being shielded one by one in the order;
    acquiring an operation trajectory of the user's hand according to the order in which different proximity sensors are shielded;
    acquiring a corresponding audio playback operation instruction according to the operation trajectory and a preset trajectory instruction library, wherein the preset trajectory instruction library stores operation trajectories and audio playback operation instructions corresponding to the operation trajectories, and wherein acquiring the corresponding audio playback operation instruction includes determining the operation trajectory to be touching the first proximity sensor or the second proximity sensor more than one time continuously, and thus determining the audio playback operation instruction to be play or pause, if the first proximity sensor or the second proximity sensor is shielded more than one time continuously within the preset time period; and
    transmitting the audio playback operation instruction to the mobile terminal, so that the mobile terminal executes the audio playback operation instruction.

2. The audio playback control method of the mobile terminal according to claim 1, wherein the plurality of proximity sensors includes at least one infrared proximity sensor; and the step of acquiring information about whether each proximity sensor is shielded at each moment within the preset time period according to the proximity information comprises:
  if an intensity of an infrared signal detected by an infrared receiver of a target proximity sensor at a certain moment is greater than or equals to a preset threshold, determining that the target proximity sensor is shielded at the certain moment; and
  if the intensity of the infrared signal detected by the infrared receiver of the target proximity sensor at the certain moment is less than the preset threshold, determining that the target proximity sensor is not shielded at the certain moment.

3. The audio playback control method of a mobile terminal according to claim 1, wherein
  the step of acquiring a corresponding audio playback operation instruction according to the operation trajectory and a preset trajectory instruction library comprises:
  if the operation trajectory is movement from the first proximity sensor to the second proximity sensor, acquiring an audio playback operation instruction to reduce volume;
  if the operation trajectory is movement from the second proximity sensor to the first proximity sensor, acquiring an audio playback operation instruction to increase volume;
  if the operation trajectory is movement first from the second proximity sensor to the first proximity sensor and then from the first proximity sensor to the second proximity sensor, acquiring an audio playback operation instruction to switch to a previous audio; and
  if the operation trajectory is movement first from the first proximity sensor to the second proximity sensor and then from the second proximity sensor to the first proximity sensor, acquiring an audio playback operation instruction to switch to a next audio.

4. A wireless earphone, comprising:
  a plurality of proximity sensors being spaced at a distance of 6 mm-10 mm lest a user's hand approaches more than one proximity sensor at the same time, a memory and a processor; wherein the plurality of proximity sensors are sequentially arranged along a curve or a straight line, wherein the plurality of proximity sensors include a first proximity sensor and a second proximity sensor, and wherein
  each proximity sensor and the memory are all connected to the processor, and
  each proximity sensor is arranged on an outer surface of the wireless earphone, and is for collecting proximity information of a user's hand within a preset time period and sending the proximity information to the processor, and wherein
  the processor is configured for:
    acquiring information about whether each proximity sensor is shielded at each moment within the preset time period according to the proximity information;
    determining an order in which different proximity sensors are shielded according to the information about each proximity sensor being shielded one by one in the order;
    acquiring an operation trajectory of the user's hand according to the order in which different proximity sensors are shielded;
    acquiring a corresponding audio playback operation instruction according to the operation trajectory and a preset trajectory instruction library in the memory, wherein the preset trajectory instruction library stores operation trajectories and audio playback operation instructions corresponding to the operation trajectories, and wherein acquiring the corresponding audio playback operation instruction includes determining the operation trajectory to be touching the first proximity sensor or the second proximity sensor more than one time continuously, and thus determining the audio playback operation instruction to be play or pause, if the first proximity sensor or the second proximity sensor is shielded more than one time continuously within the preset time period; and
    transmitting the audio playback operation instruction to a mobile terminal, so that the mobile terminal executes the audio playback operation instruction.

5. The wireless earphone according to claim 4, wherein the plurality of proximity sensors includes at least one infrared proximity sensor which is provided with an infrared emitter for sending an infrared signal outward and an infrared receiver for receiving an infrared signal reflected by a user's hand.

6. The wireless earphone according to claim 5, wherein the processor is further for:
  if an intensity of an infrared signal detected by the infrared receiver of a target proximity sensor at a certain moment is greater than or equals to a preset threshold, determining that the target proximity sensor is shielded at the certain moment; and
  if the intensity of the infrared signal detected by the infrared receiver of the target proximity sensor at the certain moment is less than the preset threshold, determining that the target proximity sensor is not shielded at the certain moment.

7. The wireless earphone according to claim 4, wherein the processor is further configured for:
  if the operation trajectory is movement from the first proximity sensor to the second proximity sensor, acquiring an audio playback operation instruction to reduce volume;
  if the operation trajectory is movement from the second proximity sensor to the first proximity sensor, acquiring an audio playback operation instruction to increase volume;
  if the operation trajectory is movement first from the second proximity sensor to the first proximity sensor and then from the first proximity sensor to the second proximity sensor, acquiring an audio playback operation instruction to switch to a previous audio; and
  if the operation trajectory is movement first from the first proximity sensor to the second proximity sensor and then from the second proximity sensor to the first proximity sensor, acquiring an audio playback operation instruction to switch to a next audio.

8. The wireless earphone according to claim 4, wherein the plurality of proximity sensors includes two to four proximity sensors.

9. The wireless earphone according to claim 4, wherein the plurality of proximity sensors are arranged on an outer surface of a battery compartment of the wireless earphone.

10. The wireless earphone according to claim 4, wherein the plurality of proximity sensors are arranged on an outer surface of a connection part between a battery compartment and an earplug of the wireless earphone.

* * * * *